US006804806B1

(12) United States Patent
Bansal et al.

(10) Patent No.: US 6,804,806 B1
(45) Date of Patent: Oct. 12, 2004

(54) METHOD OF DELIVERING AN AUDIO OR MULTIMEDIA GREETING CONTAINING MESSAGES FROM A GROUP OF CONTRIBUTING USERS

(75) Inventors: Pradeep K. Bansal, Dayton, NJ (US); Lee Begeja, Gillette, NJ (US); Anil Dass Chaturvedi, Scotch Plains, NJ (US); Carroll W. Creswell, Basking Ridge, NJ (US); John A. Rotondo, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 876 days.

(21) Appl. No.: 09/173,286

(22) Filed: Oct. 15, 1998

(51) Int. Cl.[7] ......................... G06F 15/00; G06F 17/00; G06F 17/21

(52) U.S. Cl. ..................... 715/500.1; 379/88.1; 705/26; 709/205

(58) Field of Search ....................... 345/302; 379/88.07, 379/112, 88.19, 88.23, 88.16, 88.1; 704/500; 705/26, 408; 709/205; 715/500.1

(56) References Cited

U.S. PATENT DOCUMENTS 5,719,920 A * 2/1998 Harman ....................... 379/88
5,724,508 A * 3/1998 Harple, Jr. et al. ......... 709/205
5,787,151 A * 7/1998 Nakatsu et al. .......... 379/88.23
5,826,235 A * 10/1998 Harman ...................... 704/500
5,832,060 A * 11/1998 Corlett et al. ............ 379/88.19
5,864,604 A * 1/1999 Moen et al. ................ 379/112
5,870,718 A * 2/1999 Spector ....................... 705/26
5,918,220 A * 6/1999 Sansone et al. ............. 705/408
6,067,348 A * 5/2000 Hibbeler .................. 379/88.16

OTHER PUBLICATIONS

Schmandt, Chris, Phoneshell: the telephone as computer terminal, Proceedings of the first ACM international conference on Multimedia, pp. 373–382. Aug. 1993.*

Shaw, Michelle, Microsoft Office 6 in 1, Que Corporation, pp. 512–539, 565–574. 1994.*

* cited by examiner

*Primary Examiner*—Joseph Feild
*Assistant Examiner*—William L. Bashore
(74) *Attorney, Agent, or Firm*—Kenyon & Kenyon

(57) ABSTRACT

A method and apparatus for delivering a greeting from a group of individuals to an individual or another group of individuals is disclosed. Recipient information, contributor information, billing information, and an input from each contributor are received by the system. The system composes the greeting using the contributor inputs and delivers the greeting to the recipient in the form of an audio or multimedia greeting. All the contributors can simultaneously provide their input to the greeting or individual contributors can connect to the system (at any time before a predetermined time limit) and add an input to the greeting after reviewing the prior inputs of other contributors.

13 Claims, 6 Drawing Sheets

METHOD OF DELIVERING AN AUDIO OR MULTIMEDIA GREETING CONTAINING MESSAGES FROM A GROUP OF CONTRIBUTING USERS

FIELD OF THE INVENTION

The present invention relates generally to a method for transmitting a multi-point to point communication, and more particularly to a method for delivering an audio or multimedia greeting from a group of individuals to an individual or to another group of individuals.

BACKGROUND INFORMATION

There are many holidays and occasions during a year when people wish to convey their thoughts and feelings in a greeting to another person or group of people. These holidays and occasions include Mothe's/Father's Day, Christmas Day, birthdays, and the retirement date of a co-worker. On a number of these occasions, a group of people may collectively wish to deliver a greeting to another person or group of individuals.

One known method for collectively delivering a greeting from a group of individuals entails using a paper greeting card. For example, a group of siblings may each sign one greeting card and deliver the card to their mother on Mother's Day. Similarly, a group of employees may each sign one card and deliver the card to a co-worker on the occasion of his/her birthday. Collectively signing and delivering a card to another person or group is easily organized and accomplished if everyone who wishes to sign the card is in the same geographic area and if all the participants have time in their schedules when the card is available for signing. Unfortunately, these location and time elements are not always easily coordinated. Siblings frequently live in different cities and office workers are often either on different work schedules or traveling away from the office on business near the date of a holiday or occasion.

Another known method for collectively delivering a greeting from a group of individuals is the family conference call. During a family conference call, several geographically separated family members are connected in one telephone call. Because each connected family member can hear and speak to all of the other connected family members, greetings are easily exchanged. However, this method requires prior coordination to ensure all the family members will be available to connect to the telephone call at the appointed time.

There is a need for a service which will allow a group of people, who may be geographically separated and/or on different time schedules, to create and deliver a greeting to another individual or to a group.

SUMMARY OF THE INVENTION

The present invention allows a group of people to create an audio or multimedia greeting, composed of individual inputs from members of the group, and deliver the greeting to an individual or another group of people. In one example of an embodiment of the present invention, to deliver an audio greeting, the members of the delivering group record their separate audio greeting using any telephone. The individual audio greetings are stored in the system, collated in a sequence, integrated into one greeting, and delivered to the recipient.

In another embodiment of the present invention, a group of individuals may simultaneously record their audio greeting using the system during a conference call. The integrated greeting can be delivered to the recipient in the form of an audio message over the telephone, through the mail over a recording medium (e.g., an audio cassette or a compact disc (CD)), over the Internet, or using any combination of these delivery methods. The delivery time of the integrated audio greeting can be pre-specified. In the first example mentioned above, individual contributors can access the system and listen to greetings previously recorded by other members of the group before providing their input.

In yet another embodiment of the invention, a multimedia greeting can be created and delivered using a multimedia device such as a personal computer (PC), a television (TV), or attachments to either of these devices. In one embodiment of the present invention, a first member of the group of contributors connects to the system and selects a starter multimedia greeting. Next, the remaining contributors annotate the multimedia greeting using either a sequential or parallel annotation method. For sequential annotation, the system transmits the starter multimedia greeting from one contributor to the next. Upon receiving the starter greeting, the individual contributor adds his/her annotation and transmits the starter greeting back to the system. Parallel annotation entails each individual contributor connecting to the system, when their individual schedules permit, and adding his/her annotation directly to the system. Each contributor may add multiple annotations, such as a voice annotation followed by a video annotation. The annotations from the contributors can be text-based, graphic, audio, or video in nature. The system then combines these individual annotations into one greeting. The delivery time of the integrated multi-media greeting can be pre-specified. Delivery and scheduling of the multimedia greeting can be accomplished via a computer network (e.g., the Internet), through the mail over a recording medium (for example, a video cassette, or a CD), on a TV or cable network, or using any combination of these delivery methods.

DETAILED DESCRIPTION

Figure 1:
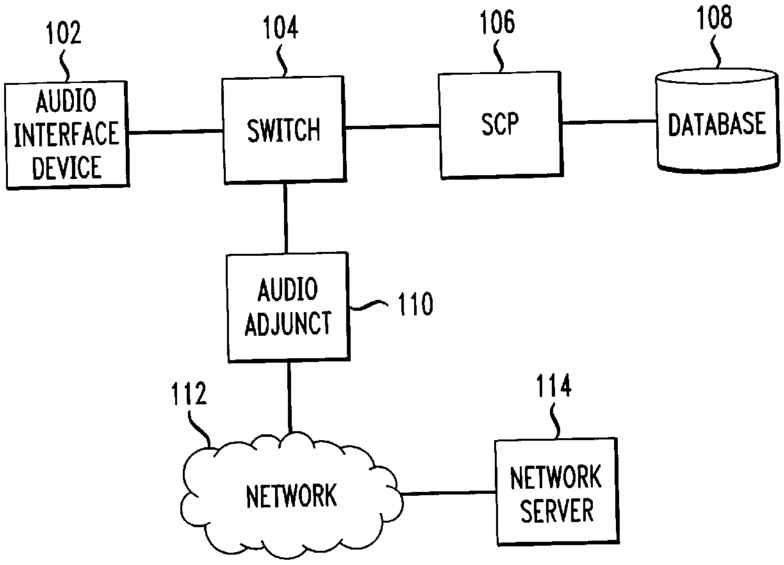
FIG. 1 is a block diagram of a system suitable for practicing one embodiment of the invention.

FIG. 1 is a block diagram of a system suitable for practicing one embodiment of the invention. As shown in FIG. 1, an audio interface device 102 is connected to a switch 104. Examples of audio interface device 102 include any wired or wireless station capable of processing audio signals, such as a plain old telephone (POT) or a cellular telephone. Switch 104 can be one of any number of public switches that are part of a voice network (such as the Public Switched Telephone Network (PSTN)), or a private switch such as a private branch exchange (PBX). Switch 104 is connected to a service control point (SCP) 106, which in turn is connected to a database 108. Switch 104 is also connected to an audio adjunct 110. Audio adjunct 110 is connected to data network 112 having a network server 114. Examples of network 112 include the Internet and Word Wide Web (WWW). In this embodiment of the invention, audio adjunct 110, network 112, and network server 114 communicate using the Transmission Control Protocol/Internet Protocol (TCP/IP) and Hypertext Transfer Protocol (HTTP).

Figure 2:
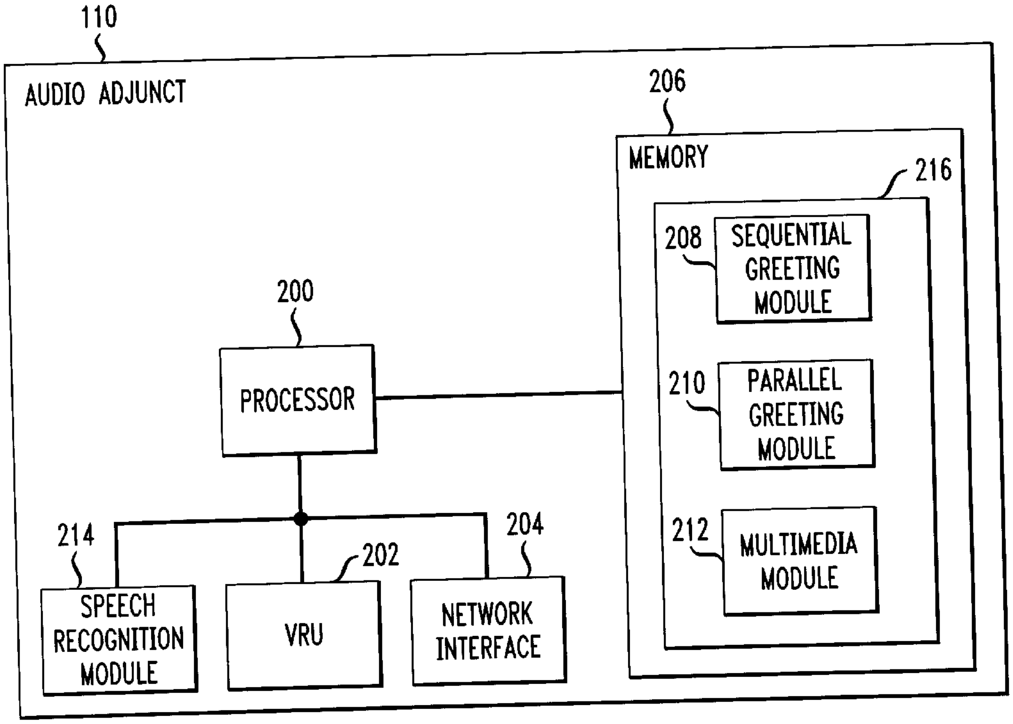
FIG. 2 is a block diagram of an audio adjunct in accordance with one embodiment of the invention.

FIG. 2 is a block diagram of an audio adjunct in accordance with one embodiment of the invention. Audio adjunct 110 comprises a processor 200 connected to a computer readable memory 206, a speech recognition module 214, a voice recognition unit 202, and a network interface 204. Memory 206 stores a greeting module 216. In this embodiment of the invention, greeting module 216 is comprised of computer program code segments which, when executed by processor 200, implement the main functionality for this embodiment of the invention. These segments are separated into three modules: (1) a sequential audio asynchronous greeting module 208, (2) a parallel audio asynchronous greeting module 210, and (3) a multimedia module 212. These three modules are included within a module known as a greeting module 216. The operation of modules 208, 210, and 212 will be discussed with reference to FIGS. 3, 4, and 5.

Figure 3:
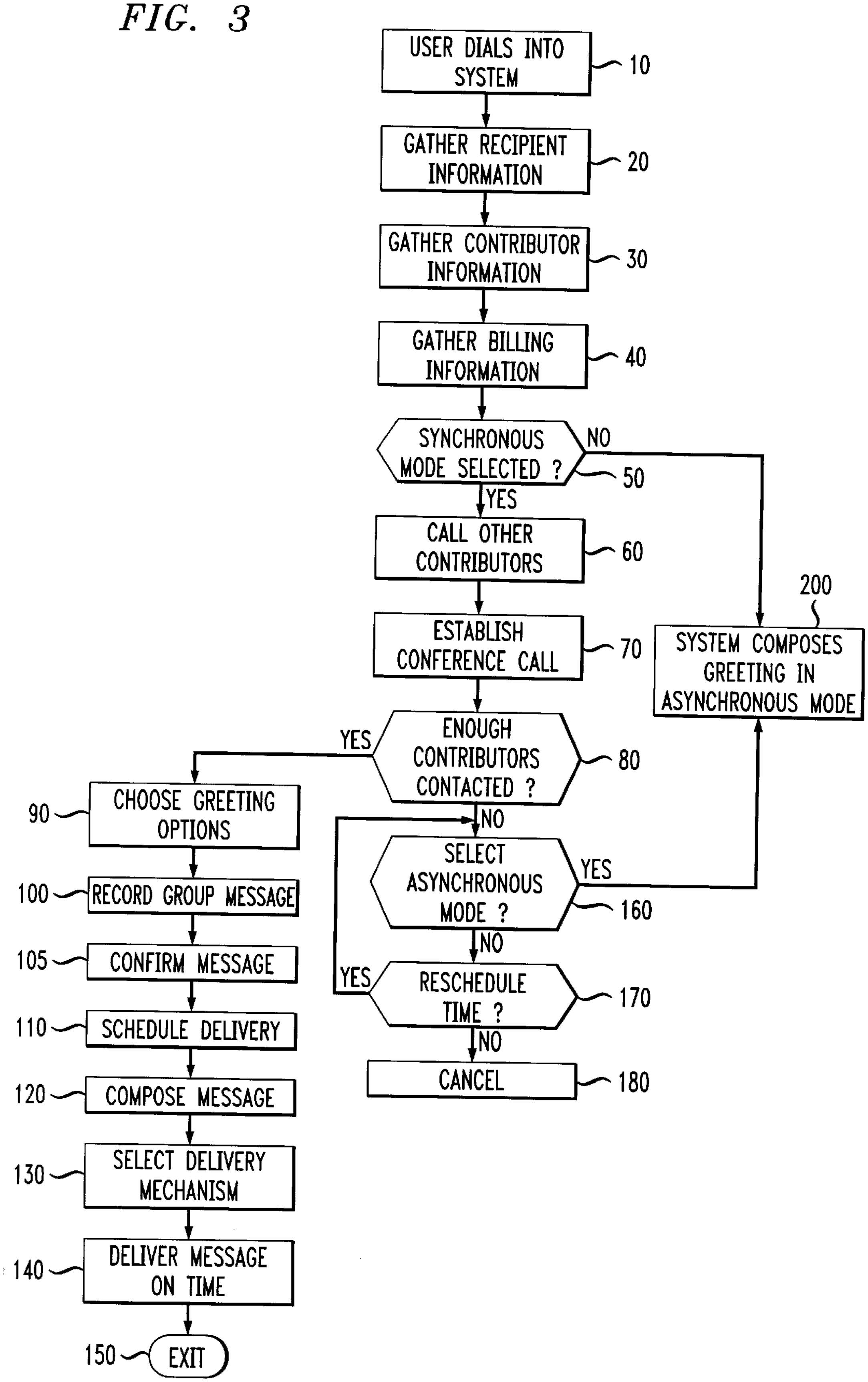
FIG. 3 illustrates a flow chart with steps for creating and delivering an audio greeting in accordance with one embodiment of the invention.
Figure 4:
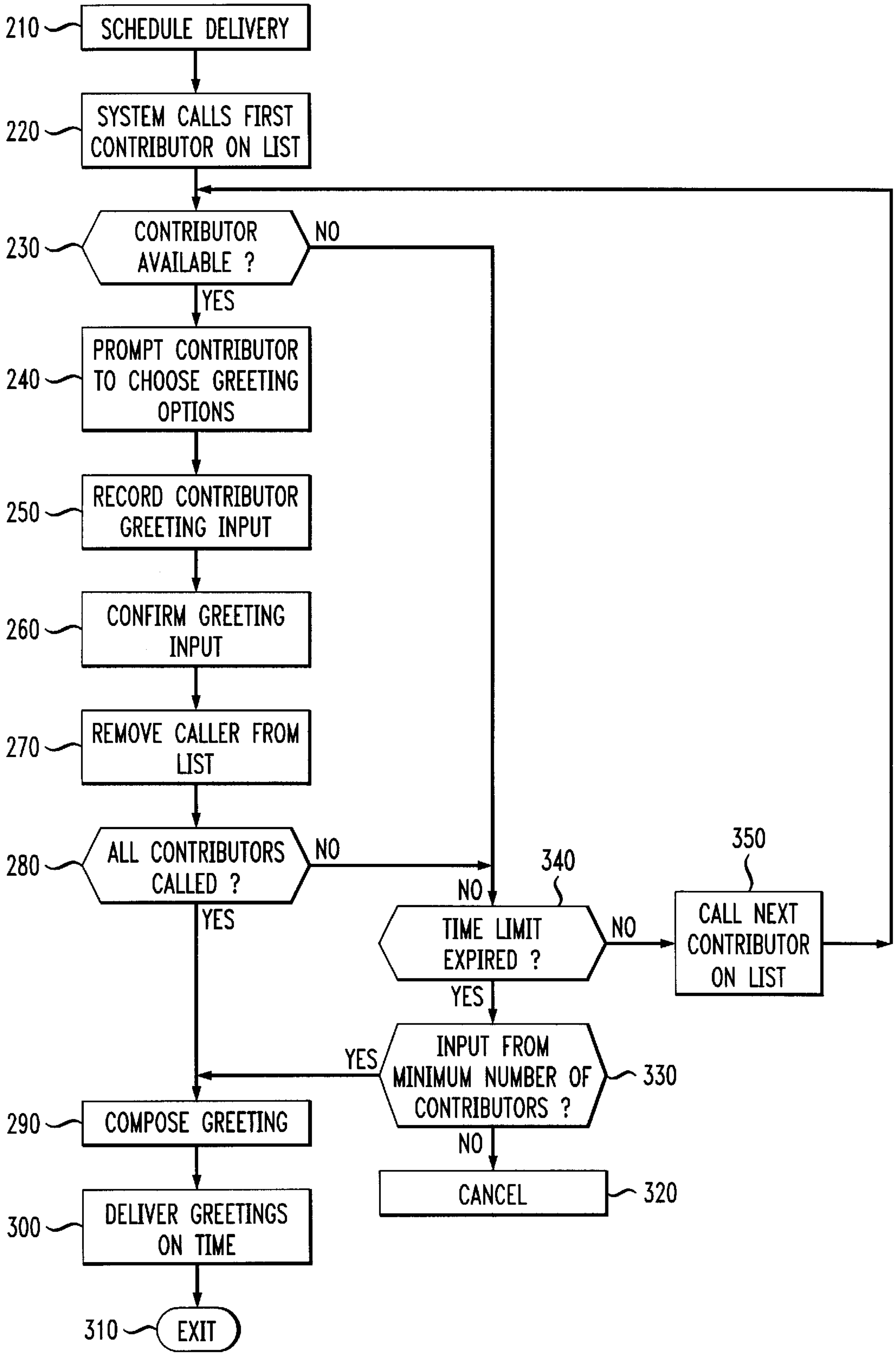
FIG. 4 illustrates a flow chart with steps for sequential audio asynchronous greeting assembly in accordance with one embodiment of the invention.

The method for creating and delivering an audio greeting according to the present invention will now be explained with reference to FIG. 3. FIG. 3 illustrates a flow chart with steps for creating and delivering an audio greeting in accordance with one embodiment of the invention. The flow charts of FIGS. 4, 5, 6, and 7 can be executed in any known programming language, for example C++. In step 10 of FIG. 3, a user dials into the system using audio adjunct 110 via either audio interface device 102 or network server 114 (both illustrated in FIG. 1). In step 20, the system prompts the user for information concerning the intended recipient(s) of the greeting. This information may include a name(s) and a telephone number to which the greeting may be sent. In step 30, the system prompts the user for information concerning the other people who will contribute inputs to the audio greeting. This information may include names and telephone numbers. In step 40, the system prompts the user for information on how to bill whoever is paying for this greeting. This information may include credit card or checking account numbers. Next, in step 50, the system will prompt the user to select between synchronous greeting assembly or asynchronous greeting assembly. Synchronous greeting assembly entails all contributors simultaneously creating the greeting; and asynchronous greeting assembly permits each contributor to add an input to the final greeting at any time before a pre-determined time limit expires.

If synchronous greeting assembly is selected, in step 50, the system will proceed to step 60 and call each contributor using the contributor information gathered in step 30. In step 70, the system will attempt to establish a conference call including each called contributor. The system will then inform the user of the number of contributors currently joined to the conference call (step 80). If the user indicates that not enough contributors have joined the conference call, the system will proceed to step 160 and prompt the user to select asynchronous greeting assembly. If the user selects asynchronous greeting assembly, then greeting assembly may continue using either the exemplary sequential assembly method steps illustrated in FIG. 4 or the exemplary parallel assembly method steps illustrated in FIG. 5. If the user does not select asynchronous greeting assembly in step 160, the system will prompt the user to select a time when synchronous greeting assembly can be rescheduled (step 170). If the user does not wish to reschedule, the order will be canceled in step 180.

If, in step 80, the user indicates that enough contributors have joined the conference call, the system will proceed to step 90 and prompt the user to choose greeting options. These options may include selecting background music with which the contributors will sing along or selecting music with vocals after the playing of which the contributors will add a verbal message. Next, in step 100, the system will record the group greeting. In step 105 the system will confirm the greeting by playing the greeting for the contributors to hear and prompting the contributors to indicate satisfaction with the recorded greeting. If the contributors are not happy with the recorded greeting, they may elect to re-record the greeting or select another option. Once the contributors accept the recorded greeting, in step 110, the system will prompt the user to schedule a delivery date/time. In step 120, the final version of the message will be composed. In step 130, the system will prompt the user to select a delivery mechanism. These delivery options may include delivering the message to the recipient over the telephone, mailing a copy of the greeting recorded onto a recorded medium (such as an audio cassette or a compact disc (CD), delivering a copy of the recorded greeting over the Internet, or any combination of these delivery options. In step 140, the system will deliver the greeting to the recipient on time.

If asynchronous-greeting assembly is selected in either step 50 or step 160, the system will proceed to step 200 and assemble the greeting after sequentially collecting inputs from each contributor. An example of a method for accomplishing asynchronous greeting assembly is illustrated by the flow chart of FIG. 4. In step 210, the system will prompt the user for a delivery date/time. In one embodiment, the system may receive the first greeting input (sub-message) from the originating user. In step 220, the system will call the first contributor on the list received in step 30 of FIG. 3. In step 230, the system will determine whether this contributor is available to make a contribution. If the contributor is available, the system will proceed to step 240 and prompt the contributor to select greeting options which may include those options presented above in step 90 of FIG. 3 and an option to first listen to the inputs of prior contributors to the same greeting. In step 250, the system will record this contributor's greeting input (sub-message). In step 260, the system will permit this contributor to review and confirm his/her input. The contributor can choose to re-record his/her input using the same selected option, select another greeting option, or select this recording as the final version of his/her input. In step 270, the system will remove the caller from the list of contributors. In step 280, the system will determine whether all contributors have been called. If all contributors have not been called, in step 340, the system will determine if the time for collecting contributions has-expired. This time limit is derived from the delivery date/time selected by the user in step 210. If this time period has not expired, the system will call the next contributor on the list at step 350. If the time period has expired, at step 330, the system will determine whether a minimum number of contributors have provided inputs for the greeting or, alternatively, whether certain predetermined contributors ("key contributors") have provided inputs. If the minimum number of contributors or certain key contributor(s) have not been contacted, the system will cancel the order in step 320. If the minimum number of contributors or certain key contributors have been contacted, the system will compose the greeting in step 290. In step 300 the system will deliver the greeting to the recipient. If, in step 280, all the contributors have been called, the system will proceed with steps 290 and 300.

Figure 5:
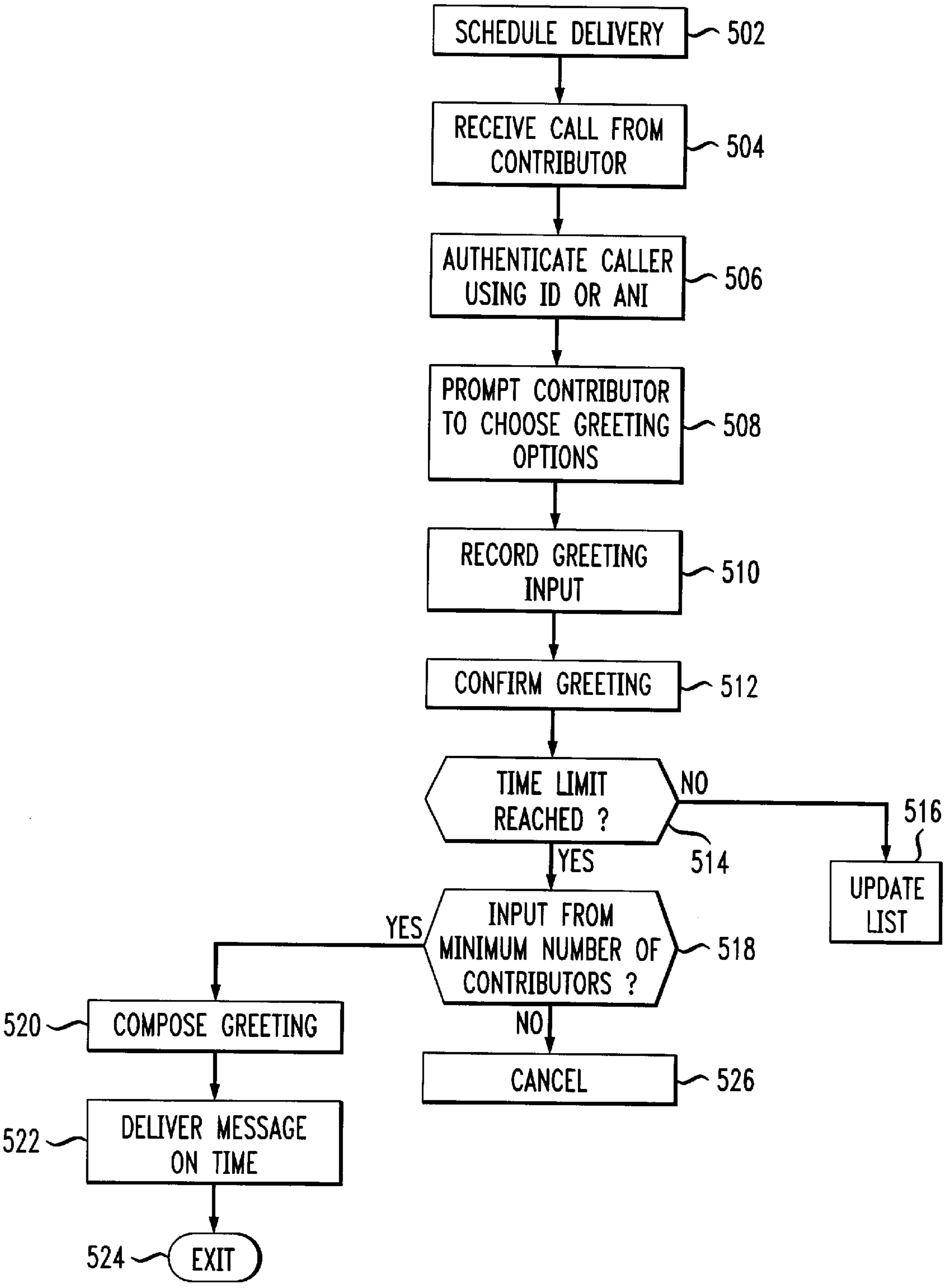
FIG. 5 illustrates a flow chart with steps for parallel audio asynchronous greeting in accordance with one embodiment of the invention.

Another example of asynchronous greeting assembly is illustrated by the flow chart in FIG. 5. In this example, rather than the system contacting each contributor sequentially, the system receives telephone calls from the contributors seeking to submit their inputs to the audio greeting. A predetermined time limit for receiving inputs from the contributors will be derived from the delivery date/time. In step 502, the system will prompt the user for a delivery date/time. In step 504, the system will receive a call from a potential contributor. In step 506 (using an identification (ID) number, automatic number identifier (ANI) information, or another authentication method), the system will verify that the caller is a contributor included on the list received in step 30 of FIG. 3. In step 508, once the caller has been identified as a contributor, the system will prompt the contributor to choose a greeting option. These options may include those described above in step 90 of FIG. 3 and an option to first listen to the inputs of prior contributors to the same greeting. In step 510, the system will record the contributor's greeting input. In step 512, the system will play the greeting input back for the contributor and the contributor will have the option of selecting this recording as the final version of his/her input, selecting another greeting option, or re-recording his/her input using the same selected option. Next, in step 514, the system will determine whether the time limit for completing the greeting has expired. If the pre-determined time limit has not expired, in step 516, the system will update a list of contributors who have provided an input and wait for the next contributor to call. If the time limit has expired, in step 518, the system will determine whether an input has been received from a user-selected minimum number of contributors or certain key contributors. If the system has not received an input from the user-selected minimum number of contributors or certain key contributors, the order will be canceled in step 526. If the system has received an input from the selected minimum number of contributors or certain key contributors, in step 520, the system will compose the greeting from the received inputs. The greeting could be generated by concatenating the received inputs in the order they were received, or by rearranging the received inputs according to a predetermined sequence selected by the initiating user or system heuristics. In step 522, the system will deliver the message to the recipient on time.

Figure 6:
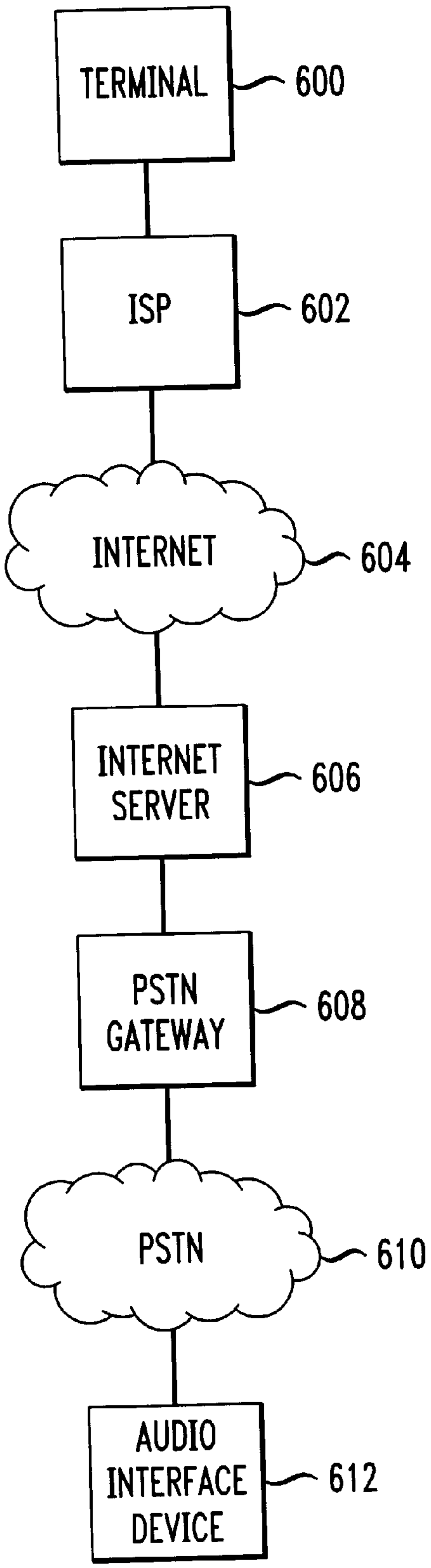
FIG. 6 is a block diagram of a system suitable for practicing another embodiment of the invention.

FIG. 6 illustrates an example of a system for composing a multimedia greeting. Terminal 600 (e.g., a personal computer, a WEB TV connection or a network computer) is connected to Internet Service Provider (ISP) 602. ISP 602 is connected to a network 604 (for example, the Internet). Internet 604 is connected to an Internet server 606, which in turn is connected to the PSTN 610 via PSTN gateway 608. PSTN 610 is also connected to an audio interface device 612 (e.g, a telephone). Internet server 606 is a general purpose computer equipped with a network interface module capable of communicating with a network using TCP/IP. Server 606 is similar to audio adjunct 110 (illustrated in FIG. 1), and also includes a processor and computer readable medium, such as Random Access Memory (RAM), Read-Only Memory (ROM), and so forth. Further, the computer readable medium stores computer program code segments that implement the main functionality for this embodiment of the invention. Specifically, the computer readable medium stores a sequential network asynchronous greeting module, a parallel network asynchronous greeting module, and multimedia network greeting module. The operation of these modules will be discussed in detail with reference to FIG. 7.

Figure 7:
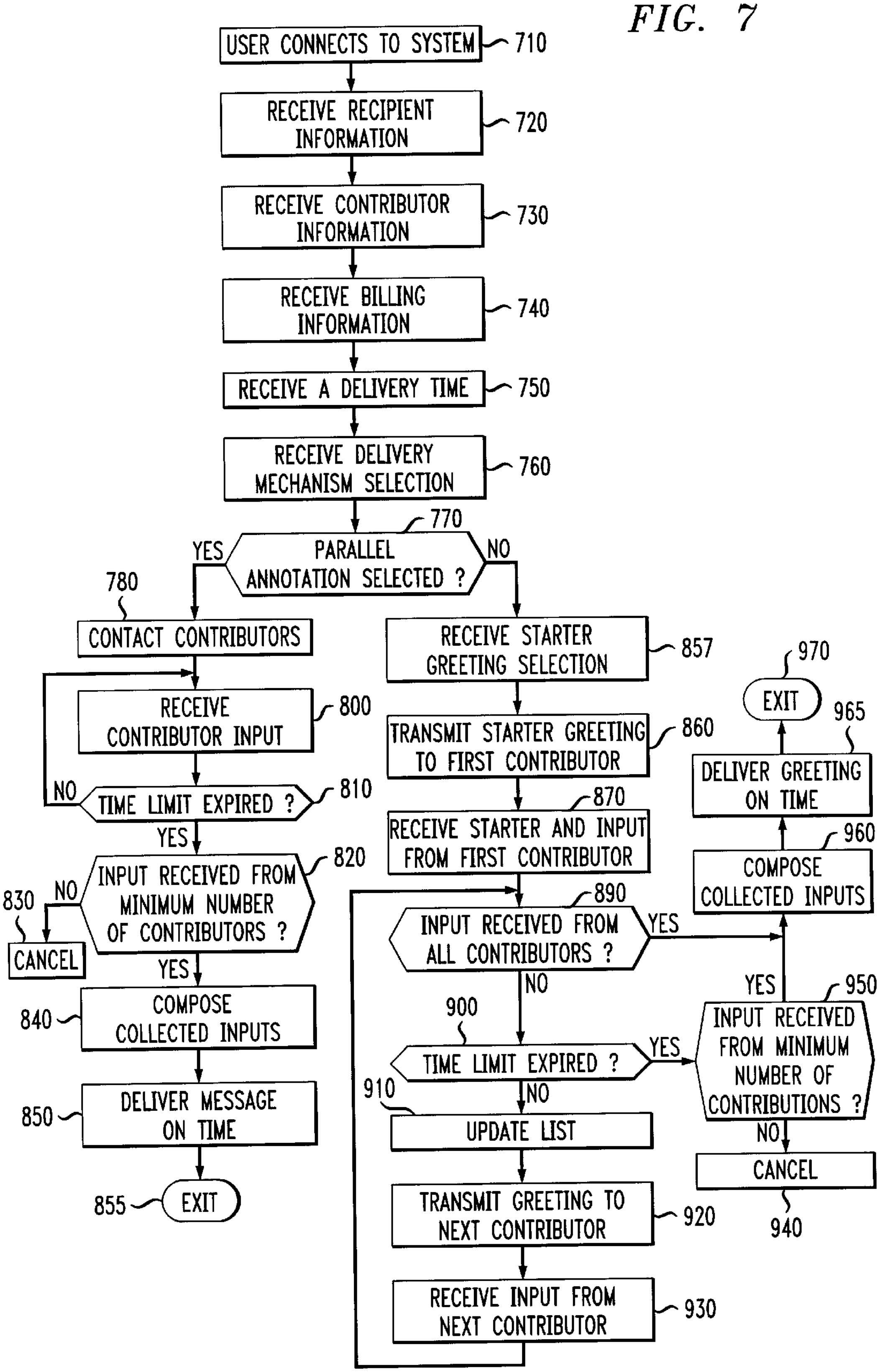
FIG. 7 illustrates a flow chart with steps for delivering a multimedia greeting in accordance with one embodiment of the invention.

FIG. 7 illustrates a flow chart with steps for delivering a multimedia greeting in accordance with one embodiment of the present invention. In step 710 a user connects to the system using audio interface device 612 or terminal 600 (both illustrated in FIG. 6). In step 720, the system gathers recipient information from the user. This information may include the recipient(s) name, telephone number and Internet address. In step 730, the system gathers contributor information from the user. This information may include the contributors' names, telephone numbers and Internet addresses. Next, in step 740, the system gathers information on how to bill whoever will be paying for this greeting. This information may include credit card or checking account numbers. In'step 750, the system will prompt the user for a delivery date/time. In step 760, the system will prompt the user to select a delivery mechanism. The delivery mechanism selections may include audio delivery via the telephone (as described above) and electronic mail (email) via a network or the Internet. In step 770, the user determines whether the greeting will be composed using parallel annotation. Parallel annotation entails the system receiving greeting inputs from the contributors who connect to the system at any time before a pre-determined time limit expires. The system will compose a greeting from the contributor inputs and deliver this greeting to the recipient parallel annotation is not selected, the system will sequentially transmit the greeting to each contributor and prompt each contributor to annotate the greeting and transmit the greeting back to the system.

If parallel annotation is selected, in step 780, the system will contact each contributor and prompt the contributors to connect to the system and provide a greeting input. In step 800, the system will receive an input from a contributor. Next, in step 810, the system will determine whether the pre-determined time limit has expired. If the time limit has not expired, the system will wait for the next contributor to connect to the system and provide an input.

If, in step 810, the time limit has expired, the system will check to determine if inputs have been received from a user-selected minimum number of contributors or certain key contributors. If the minimum number or key contributor requirement has not been met, the system will cancel the order in step 830. If the minimum number requirement has been met, the system will proceed to step 840 and compose a greeting from the collected inputs. In step 850, the system will deliver the greeting to the recipient on time.

If the user does not select parallel annotation, in step 857, the system will prompt the user to select a starter greeting. In step 860, the system will first transmit the starter greeting and greeting options to the first contributor and then prompt the contributor to both add a greeting input 20 and transmit the starter greeting back to the system. In step 870, the system will receive an input from the first contributor. In step 890, the system will check to determine if inputs have been received from all the contributors. If all inputs have been received, the system will proceed to step 960 and compose a final greeting from the collected inputs. In step 965, the system will deliver the greeting to the recipient on time. If input has not been received from all contributors, the system will proceed to step 900 and determine whether the pre-determined time limit has expired. If the time limit at step 900 has not expired, the system will proceed to step 910 and update a list of contributors. In step 920, the system will transmit the greeting to the next contributor (as in step 860 above) and in step 930 the system will receive an input from that contributor. The system will then proceed back to step 890 to determine if an input has been received from all the contributors. If the time limit at step 900 has expired, the system will proceed to step 950 and determine if inputs have been received from the user-selected minimum number of contributors or certain key contributors. If the user-selected minimum number or key contributor requirement has not been met, then the system will cancel the order in step 940. If the minimum number or key contributor requirement has been met, the system will proceed to step 960 and compose a greeting from the collected inputs. In step 965, the system will deliver the message to the recipient on time.

Although various embodiments are specifically illustrated and described herein, it will be appreciated that modifications and variations of the present invention are covered by the above teachings and within the purview of the appended claims without departing from the spirit and intended scope of the invention. For example, the terms "terminal" and "audio interface device" are used in this disclosure as examples of devices which may be used to gain access to a network. The invention is intended to cover the use of any network device which provides a means to interact with a network. Similarly, the invention is not limited to delivering greetings. The term greeting, as used in this disclosure, is intended as an example of any message which might be delivered from a group of individuals to an individual or group of individuals.

What is claimed is:

1. A method for creating a message from a plurality of users over a network, comprising the steps of:

receiving from an originating user information for a recipient, at least one contributing user, and a first sub-message;

contacting said at least one contributing user;

receiving a second sub-message from said at least one contributing user; and composing said message using said first and second sub-messages;

wherein a universe of contributing users to which the message can be directed is restricted according to the information for at least one contributing user provided by the originating user.

2. The method of claim 1, further comprising the step of delivering said message to said recipient.

3. The method of claim 2, wherein said message is at least one of a group comprising an audio message, a text message and a multimedia message.

4. The method of claim 2, wherein said first and second sub-messages are each received over one of a voice network and a data network, and said message is delivered over said voice network.

5. The method of claim 4, wherein said voice network is a public switched telephone network and said data network uses a transmission control protocol/Internet protocol.

6. The method of claim 2, wherein said first and second sub-messages are each received over one of a voice network and a data network, and said message is delivered over said data network.

7. The method of claim 6, wherein said voice network is a public switched telephone network and said data network uses a transmission control protocol/Internet protocol.

8. A computer-readable medium whose contents cause a computer system to create a message from a plurality of users over a network, by performing the steps of:

receiving from an originating user information for a recipient, at least one contributing user, and a first sub-message;

contacting said at least one contributing user;

receiving a second sub-message from said at least one contributing user; and composing said message using said first and second sub-messages;

wherein a universe of contributing users to which the message can be directed is restricted according to the information for at least one contributing user provided by the originating user.

9. The computer-readable medium of claim 8, further performing the steps of:

delivering said message to said recipient.

10. An apparatus for creating a message from a plurality of users over a network, comprising:

a processor;

a computer readable memory connected to said processor;

a greeting module within said computer readable memory;

a speech recognition module connected to said processor;

an interface to a publicly accessible data network connected to said processor; and a voice response unit connected to said processor;

wherein the computer readable memory further comprises:

a sequential greeting module;

a parallel greeting module; and a multimedia module.

11. A apparatus for creating a message from a plurality of users over a network, comprising:

a processor;

a computer readable memory connected to said processor;

a greeting module within said computer readable memory;

a speech recognition module connected to said processor;

an interface to a publicly accessible data network connected to said processor; and a voice response unit connected to said processor;

wherein the computer readable memory further comprises:

a sequential network asynchronous greeting module;

a parallel network asynchronous greeting module; and a multimedia network greeting module.

12. A method for creating a message with multiple contributors, comprising the steps of:

receiving a first sub-message from a first network;

receiving a second sub-message from a second network;

combining said first and second sub-messages into a single message; and delivering said single message to a recipient using one of said first and second networks;

wherein a universe of contributing users to which the message can be delivered is restricted according to the information within the first sub-message.

13. The method of claim 12, wherein said first network is a data network and said second network is a voice network.

* * * * *